July 30, 1929.  W. A. WHATMOUGH ET AL  1,722,404
INTERNAL COMBUSTION ENGINE
Filed Oct. 4, 1928  2 Sheets-Sheet 1
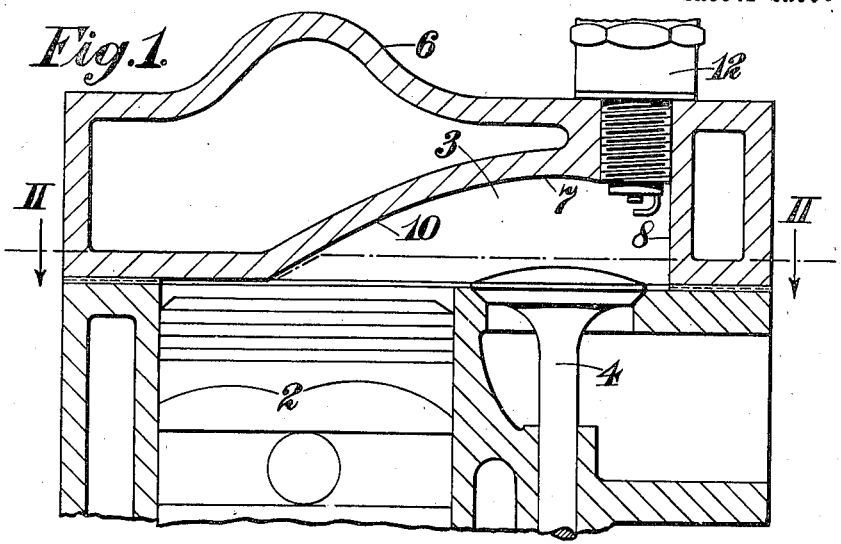
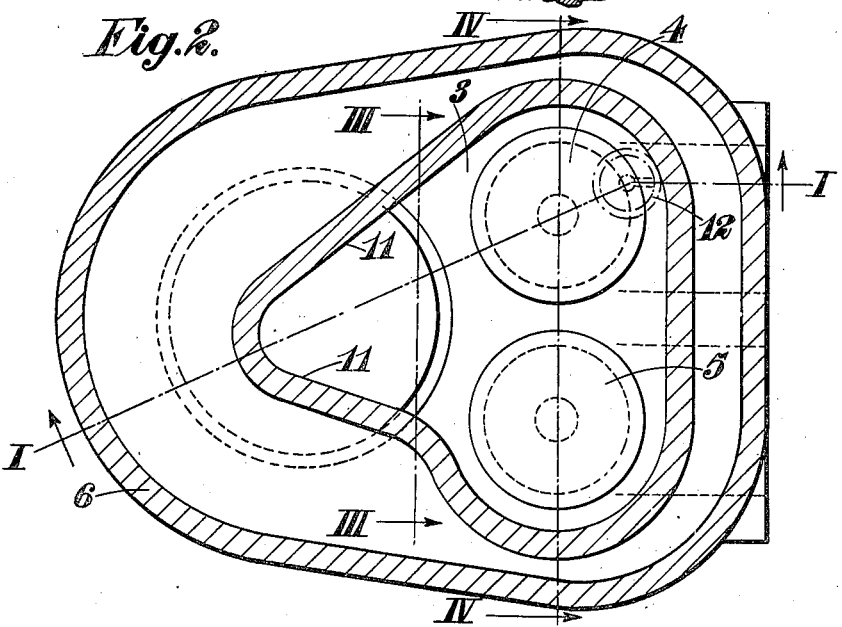
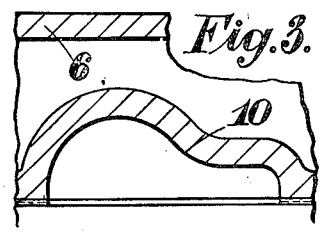
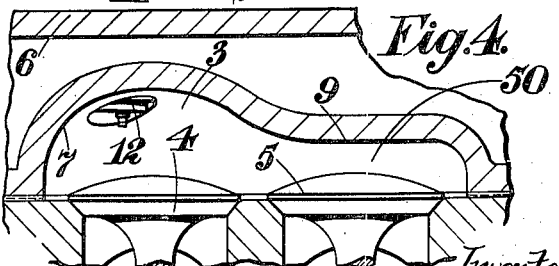
Inventor
Wilfred A. Whatmough
and Seaton McC. Findlater
By Edw. ...
Attorney

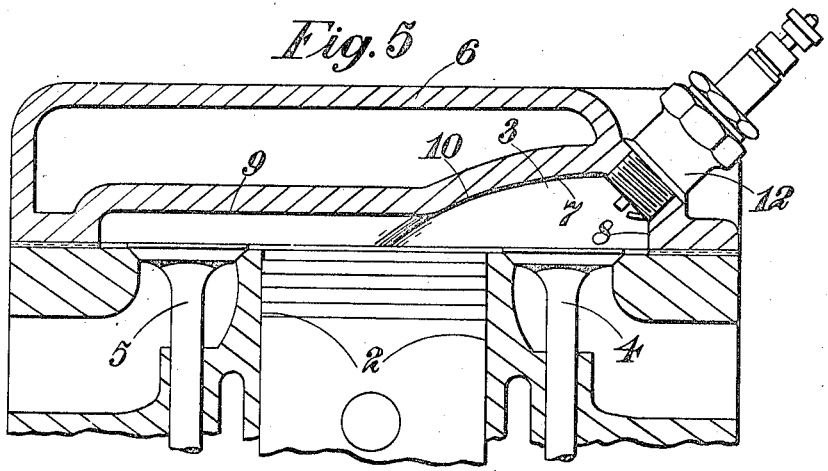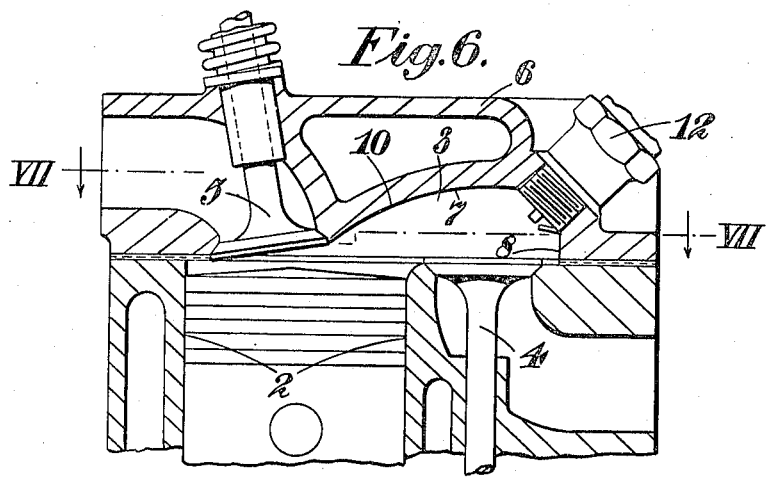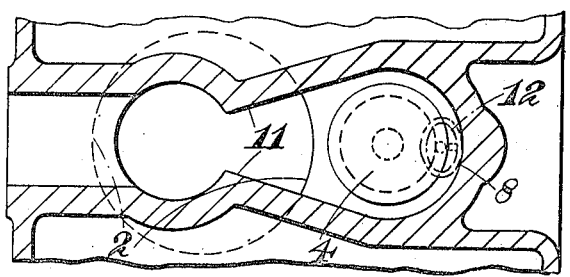

Patented July 30, 1929.

1,722,404

UNITED STATES PATENT OFFICE.

WILFRED AMBROSE WHATMOUGH, OF NEW BARNET, AND SEATON McCURDY FINDLATER, OF HIGHGATE, ENGLAND.

INTERNAL-COMBUSTION ENGINE.

Application filed October 4, 1928, Serial No. 310,342, and in Great Britain October 21, 1927.

This invention relates to cylinders for internal combustion engines having a combustion chamber of the type having a lateral cavity containing an exhaust valve, the inlet valve being either alongside the exhaust valve, or on the opposite side of the cylinder therefrom, or over the cylinder barrel.

The principal object of the invention is to provide a construction which will prevent both pre-ignition and detonation of the charge when very high compressions are used or when the fuel used is very liable to detonate or pre-ignite, and will ensure good scavenging.

In the accompanying drawings,

Figure 1 is a fragmentary vertical section on the line I—I of Figure 2 of a cylinder having side-by-side inlet and exhaust valves, Figure 2 is a sectional plan on the line II—II of Figure 1, Figure 3 is a fragmentary vertical section on the line III—III of Figure 2, Figure 4 is a fragmentary section on the line IV—IV of Figure 2, Figure 5 is a fragmentary vertical section of a cylinder having a T-head (i. e., having the inlet and exhaust valve on opposite sides of the cylinder), Figure 6 is a fragmentary vertical section of a cylinder having an exhaust valve at the side and an inlet valve inverted over the cylinder barrel, and Figure 7 is a fragmentary sectional plan on the line VII—VII of Figure 6.

Like reference numerals indicate like parts throughout the drawings.

In Figures 1–4, at the side of the cylinder barrel 2 is a lateral cavity 3 which encloses the side-by-side exhaust valve 4 and inlet valve 5, both of which are carried by the cylinder block, the cavity being in the head 6.

The cavity 3 has an unbroken rounded roof as at 7, over the exhaust valve, and the edge of the latter is spaced from the adjacent side wall 8 of the cavity. The space between the rounded roof and the crown of the exhaust valve when fully lifted from its seat is preferably the least which provides for unobstructed exhaust flow over the top of the valve so that the exhaust can escape freely around the edge of the latter remote from the barrel. These three features (i. e., the rounded roof, the amount of space between the exhaust valve and side of the cavity, and that between the exhaust valve and the roof of the cavity) combine to ensure a free outflow over the valve and between its edge and the side of the cavity, thus preventing excessive heating of the valve and so avoiding risk of pre-ignition during compression, and at the same time obtaining good scavenging.

Over the inlet valve 5 the clearance 50 from the crown of the cavity may be less than over the exhaust valve and the surface may be flat as at 9 (see Figure 4). Towards the cylinder barrel the height of the cavity gradually diminishes as at 10 from the rounded part 7 (see Figure 1) as also does the width in a direction parallel to the line joining the two valve centres (see 11, Figure 2). This gradual change of dimensions avoids corners or pockets and facilitates the passage of burning gases from the cavity into the cylinder during the working stroke.

The location for the spark plug 12 is adjacent the seating for the exhaust valve 4 and on the side of the latter remote from the cylinder barrel, and it is here arranged vertically and as close as convenient to the above specified side of the combustion chamber. It may, however, be inclined as in the constructions shown in Figures 5 and 6.

In the modification shown by Figure 5, the invention is applied to a T-head cylinder. The rounded roof as at 7 over the exhaust valve is essentially the same as is shown in Figure 1. The flat roof 9 over the inlet valve 5 extends over the cylinder barrel and merges into the rounded roof in the manner illustrated in Figure 4. The sparking plug 12, as mentioned above, is inclined so that the spark points are more nearly in the corner between the roof and side 8 of the cavity.

In Figures 6 and 7 the inlet valve 5 is arranged in the cylinder head over the cylinder barrel and may have its axis inclined as shown. It is thus possible to have a large inlet valve diameter in a small and compact combustion chamber, the arrangement being favourable to exhaust scavenging by overlapping of the timing of the two valves.

In the last two constructions it will be seen that, as in Figures 1–4, the cavity has the unbroken rounded roof over the exhaust valve and in both cases diminishes in depth and width towards the cylinder barrel. Adequate clearance is provided between the side of the cavity and the edge of the exhaust valve seating remote from the cylinder barrel so that no obstruction of outflow is occasioned, whilst as near as convenient to this position the ignition device is located on the side remote from the barrel.

The whole combustion chamber in this invention is devoid of pockets, outflow is unobstructed, and during ignition the flame can travel freely from the hotter to the cooler parts. It will be seen that in each case there are two spaces, the domed lateral cavity over the exhaust valve and a smaller clearance space in the neighborhood of the inlet valve.

The essence of the invention resides chiefly in the foregoing combination of the unbroken dome of the cavity over the exhaust valve and the location of the spark plug at the side of this valve remote from the cylinder barrel. It ensures sufficient mixture over the exhaust valve to cool the latter and result in easy ignition even when the engine has not warmed up. On ignition, the charge is first burnt over the exhaust valve (i. e., the hottest spot in the combustion chamber) thus clearing the unburnt or burning mixture from this relatively hot region and driving it towards the piston and the cooler part of the whole combustion space. This is how high compressions can be used without pre-ignition and/or detonation.

To obtain this result it is important that the space between the exhaust valve and the rounded roof over it should be the shallowest possible consistent with adequate cross section of the space for the flow of exhaust gases over the valve to the side thereof remote from the cylinder barrel, as above specified. Furthermore, the gradual narrowing of the combustion chamber as at 10 and 11 avoids surfaces which would obstruct the travel of the mixture from the spark plug towards the cylinder or might even cause a rebound.

The smooth unbroken rounded surface in the cavity over the exhaust valve permits of an easy outflow of the exhaust gases which keeps the exhaust valve much cooler than usual and prevents valve burning.

If, however, the surface of the dome over the exhaust valve is broken as by location there of the inlet valve or of the ignition device, then there would be a tendency towards detonation owing to the heat radiated between the two relatively uncooled surfaces, i. e. from the inlet and the exhaust valves.

On the other hand, if the space is enlarged between and around the two valves when placed one immediately over the other, and is not provided with sides gradually converging as they approach the barrel, there would be a marked tendency during exhaust for the flame to be directed on to the top or edge of the exhaust valve and thus lead to an undue heating thereof. Actually there would be marked turbulence above the exhaust valve during compression and exhaust. By the present invention, the exhaust gases can travel round the valve with the least possible contact therewith, for which purpose it is essential to keep the spaces approximately equal in area all around the valve.

It has been found, as a result of considerable research work, that in cylinders constructed in accordance with this invention very high compressions can be employed. Thus, in side-by-side valve engines having a cast iron cylinder head a compression of 6.25 to 1 may be adopted, whilst with a side exhaust valve and an inlet valve over the piston it may be 7 to 1 for a cylinder of 83 m/m bore fitted with a cast iron detachable head. If the latter is of aluminium (or an alloy thereof) an even higher ratio is possible.

What we claim as our invention and desire to secure by Letters Patent of the United States is:—

1. A cylinder for an internal combustion engine, having in combination a barrel, a lateral cavity connected therewith and having an unbroken rounded roof, an exhaust valve seating in said cavity, and a location for an ignition device adjacent to said seating and on the side thereof remote from said barrel, substantially as set forth.

2. A cylinder for an internal combustion engine having in combination, a barrel, a lateral cavity having an unbroken rounded roof, an exhaust valve seating in said cavity, a location for an ignition device adjacent said seating and situated on the side thereof remote from said barrel, and a connection between said cavity and said barrel which overlaps said barrel and decreases gradually in depth towards said barrel, substantially as set forth.

3. A cylinder for an internal combustion engine having in combination, a barrel, a lateral cavity having an unbroken rounded roof, an exhaust valve seating in said cavity, a location for an ignition device adjacent said seating and situated on the side thereof remote from said barrel, and a connection between said cavity and said barrel which overlaps said barrel and decreases gradually in depth and width towards said barrel, substantially as set forth.

4. A cylinder for an internal combustion engine having in combination a barrel, a lateral cavity communicating with said barrel and having a domed roof, a clearance space of smaller volume than said cavity and also communicating with said barrel, a seating in a wall of said space for an inlet valve, a seating for an exhaust valve in the floor of said lateral cavity, and a location for an ignition device at a position in said cavity adjacent to that side of said exhaust valve seating which is remote from the barrel, substantially as set forth.

5. A cylinder for an internal combustion engine having in combination, a barrel, a lateral cavity which connects therewith and has at one position a rounded unbroken roof, a seating for an exhaust valve in the wall of said cavity opposite said rounded roof, an exhaust valve co-operating with said seating, the height between the crown of said valve and said roof allowing space only for unobstructed outflow over said valve to the side thereof remote from said barrel, a space between said remote side of said valve and the adjacent boundary of said cavity sufficient for unobstructed flow of gases from the upper to the under side of said valve, and a location for an ignition device adjacent said valve seating on the side thereof remote from said barrel, substantially as set forth.

6. A cylinder for an internal combustion engine having in combination, a barrel, a lateral cavity which connects therewith and has at one position a rounded roof, the depth and width of which cavity progressively diminish towards said barrel, a seating for an exhaust valve opposite said rounded roof, a seating for an inlet valve at a position in said cavity removed from said rounded roof, and an ignition device located adjacent the side of said exhaust valve seating remote from said barrel, substantially as set forth.

In testimony whereof we have signed our names to this specification.

WILFRED AMBROSE WHATMOUGH.
SEATON McCURDY FINDLATER.